United States Patent [19]
Valente

[11] 3,712,161
[45] Jan. 23, 1973

[54] METHOD AND APPARATUS FOR FABRICATING ELONGATE STRUCTURAL MEMBERS, OR THE LIKE

[75] Inventor: Raymond L. Valente, Kankakee, Ill.
[73] Assignee: Manco Manufacturing Co., Bradley, Ill.
[22] Filed: Dec. 2, 1970
[21] Appl. No.: 94,474

[52] U.S. Cl. ............................83/50, 83/71, 83/217, 83/558, 83/560
[51] Int. Cl. ..............................................B26f 1/02
[58] Field of Search......83/55, 50, 71, 216, 217, 560, 83/558

[56] References Cited

UNITED STATES PATENTS

| 3,094,028 | 6/1963 | Ausenda et al. | 83/71 |
| 3,391,593 | 7/1968 | Jordan | 83/560 X |
| 1,241,254 | 9/1917 | Payne et al. | 83/216 |
| 3,448,645 | 6/1969 | Graf et al. | 83/71 |

Primary Examiner—James M. Meister
Attorney—Olson, Trexler, Wolters & Bushnell

[57] ABSTRACT

A method and machine for effecting fabrication of a structural member, or the like, the machine comprising a work station having tooling means, drive means for advancing a structural member longitudinally of said station, and apparatus for properly positioning the tooling means with respect to predetermined locations at which tooling operations are to be performed on said structural member. The positioning apparatus includes an indexing arrangement, as well as gauge means which permit the automatic or semi-automatic operation of the machine, such that the tooling means may be initially positioned with respect to a transverse axis of the structural member and then moved along said axis in relatively short, controlled increments to and from the points at which the tooling operations are performed.

22 Claims, 13 Drawing Figures

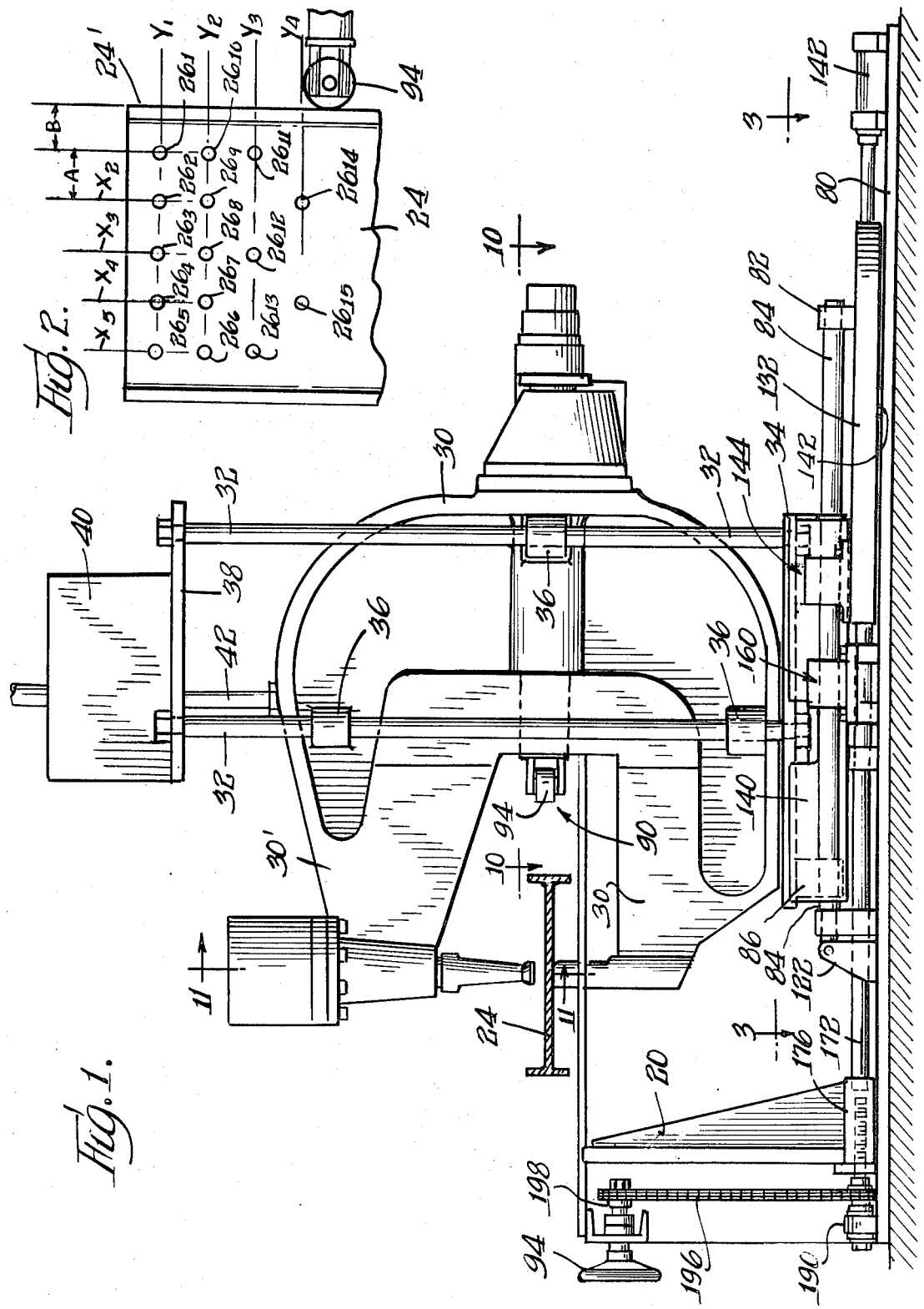

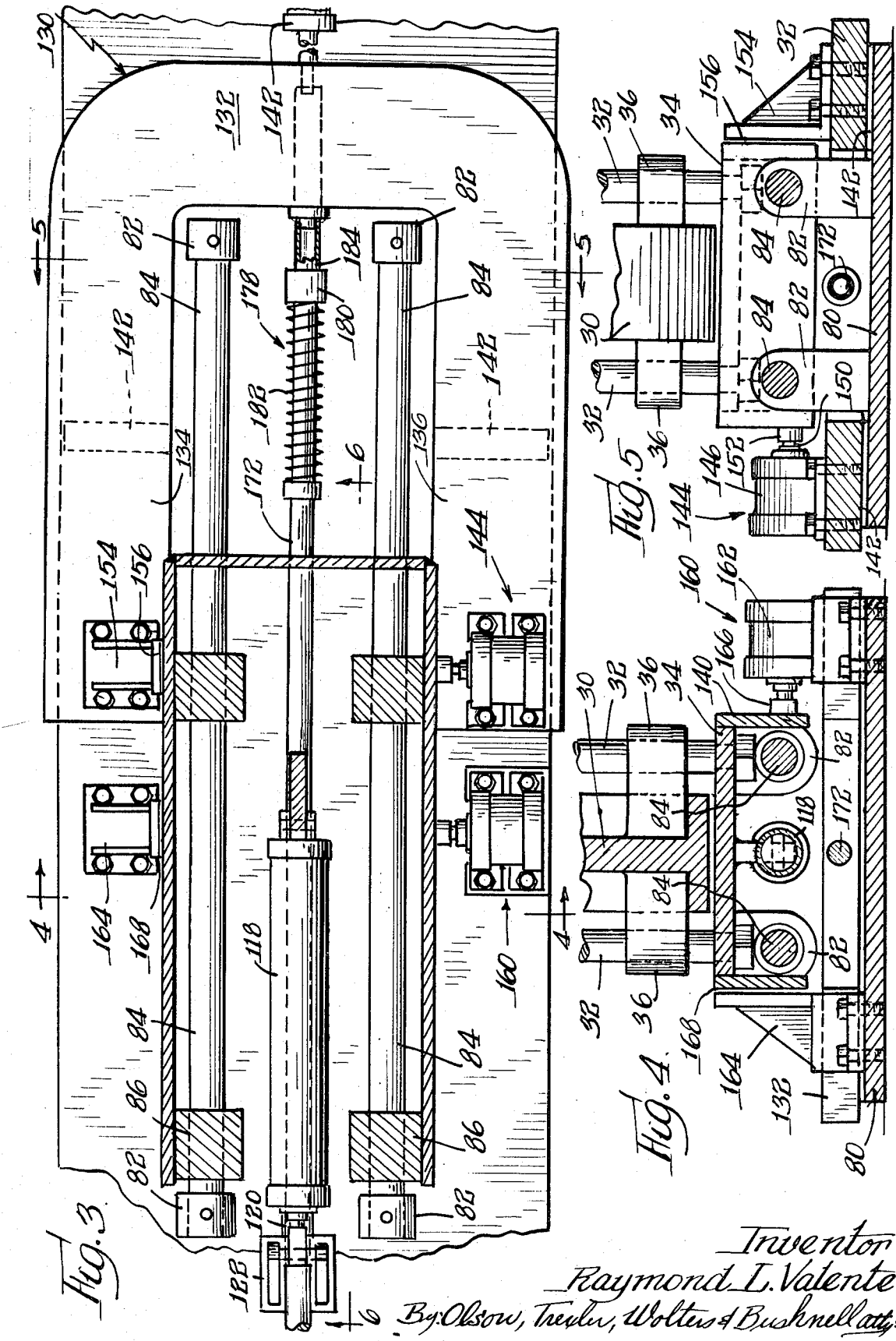

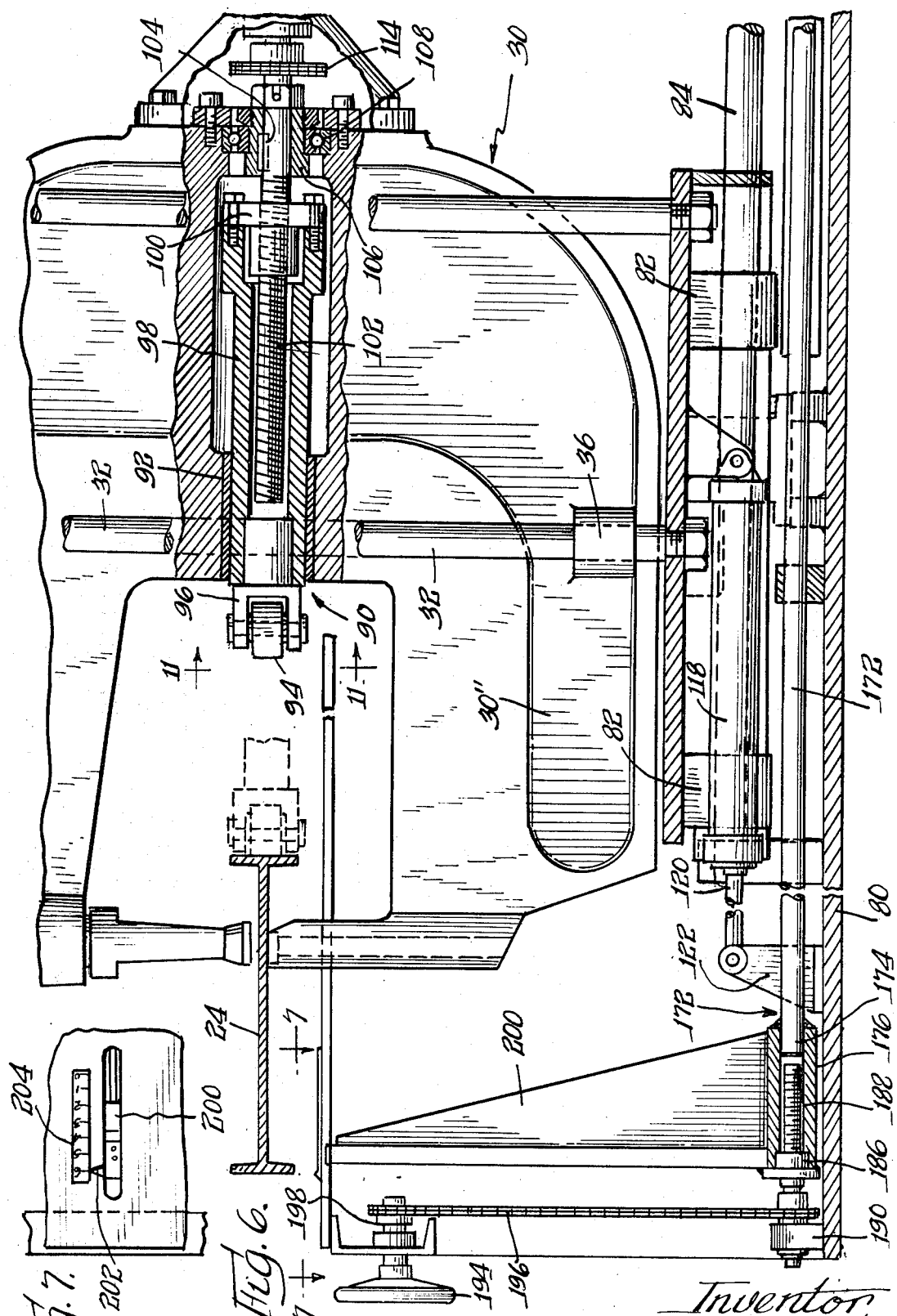

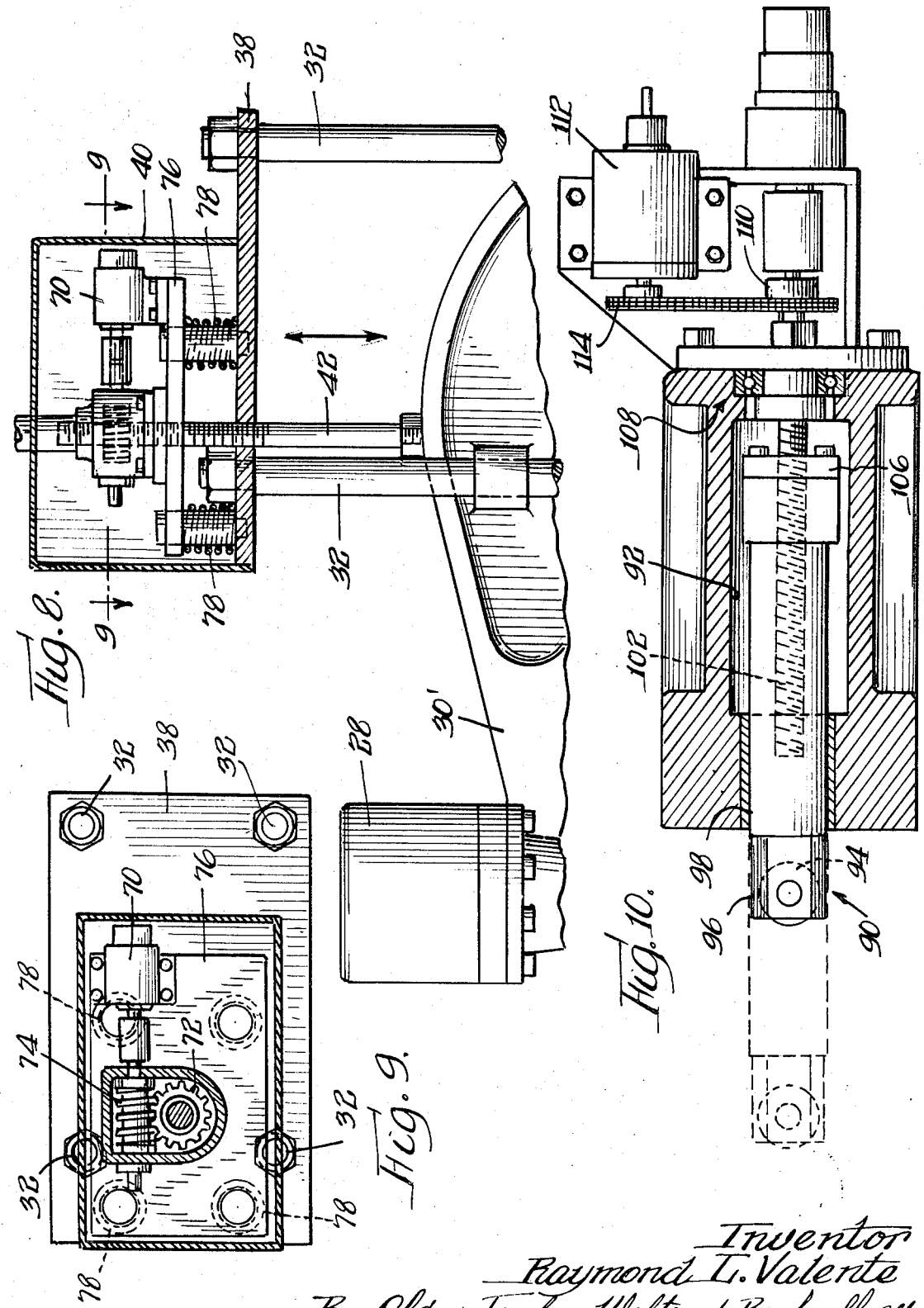

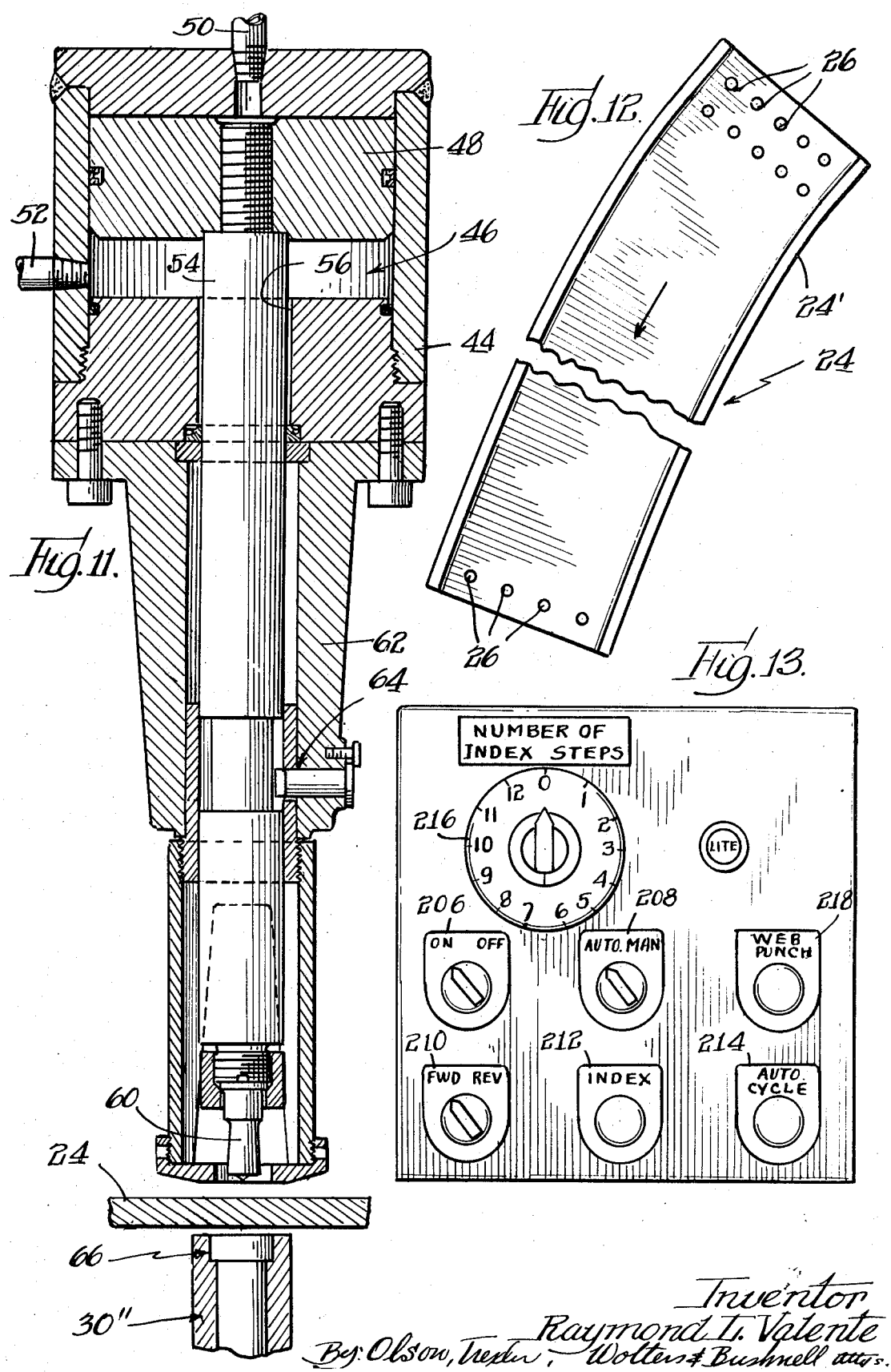

3,712,161

METHOD AND APPARATUS FOR FABRICATING ELONGATE STRUCTURAL MEMBERS, OR THE LIKE

BACKGROUND OF THE INVENTION

This invention relates to a method and apparatus for use in the fabrication of elongate structural members, or workpieces, such as angle irons, channel irons, I-beams, or the like. More particularly, the present invention provides novel apparatus for performing automatically a plurality of tooling operations at numerous locations spaced along the length of the structural member. Each said location, for reference purposes is defined as an axis extending transversely of the elongate axis of the structural member with one or more said tooling operations being performed at selected points on said transverse axis.

Programmed fabricating apparatus are available including systems for the fabrication of structural members. However, these systems utilize complex, highly sophisticated circuitry and programming apparatus. Accordingly, many fabricators and users of structural members, who would prefer to automate their existing equipment, or purchase new automated equipment, have been dissuaded by the inherent economical disadvantages of the available systems. More specifically, the precision programming and sensing means employed in these systems require an initial capital investment that is prohibitive in many cases. Also, due to the relative complexity of these systems, set-up time is lengthy, thus rendering these systems practical for long production runs only. Unfortunately, most fabricators are confronted primarily with relatively short production runs, such that the additional cost factors of these prior art systems cannot be justified. This is especially true, since in most instances the tolerances that are to be maintained, while critical within certain limits, do not necessitate the precision built into available systems.

Accordingly, not having adequate, economically feasible equipment available, most fabricators resort to a manually controlled fabricating operation. That is, an operator controls the movement of the workpiece relative to a tooling station and with repeated reference to the detailed production drawings properly aligns said workpiece with respect to said station. When this is accomplished, the fabricating apparatus is actuated. Next, the workpiece is repositioned to bring the next point at which an operation is to be performed into alignment with the tooling station and the cycle repeated again. However, this mode of fabrication requires the constant attention of the operator, as well as repeated and time-consuming checks and cross-checks with the production drawings.

SUMMARY OF THE INVENTION

The method and apparatus of the present invention were developed to accommodate the fabricating of I-beams, wherein a pattern or series of holes are to be formed therein. These holes are formed at various locations spaced along the length of the beam, which, for reference purposes, will be referred to hereinafter as the transverse or Y-axes. In addition, the spacing of the points on respective transverse axes may vary from location to location, such that the apparatus must be able to accommodate these variances. Further, it is to be realized that while the following detailed description of the invention, as well as the accompanying drawings, are concerned with a punching operation, the invention may be employed with tooling of various types.

Accordingly, the present invention concerns a novel method and apparatus which permit a fabricator to automate his equipment without a large capital investment for complex control systems. More specifically, the advantages and improvements afforded by the present invention are attained by the provision of apparatus includinG a work station, positioning meanS for orienting a workpiece with respect to the work station, and control means for effecting operation of the apparatus at the proper point in the fabricating cycle. The various components which comprise the novel apparatus of this invention are ingeniOusly simple and uncomplicated when compared to the sophiSticated prior art devices, both from a structural, as well as an operational standpoint. However, although simple and economical, the apparatus of the present invention is capable of obtaining substantially the same end results as the aforementioned systems.

DESCRIPTION OF THE DRAWINGS

FIG. 1 is an end elevational view of a tooling station for fabricating apparatus constructed in accordance with the present invention;

FIG. 2 is a partial, top plan view illustrating typical series or patterns of holes which may be formed on an elongate structural member;

FIG. 3 is a longitudinal sectional view taken along the line 3—3 of FIG. 1 and illustrating the supporting and indexing arrangements employed for the tooling station of said apparatus;

FIG. 4 is a partial sectional view taken along the line 4—4 of FIG. 3 showing a clamping arrangement employed to fix the position of the tooling station with respect to the workpiece;

FIG. 5 is a partial sectional view taken along the line 5—5 of FIG. 3 and illustrating the indexing clamping arrangement employed in advancing the tooling means from one operating position to the next;

FIG. 6 is an end elevational view similar to FIG. 1 but on an enlarged scale, and partially in section to illustrate the means employed for initially positioning the tooling station with respect to the workpiece;

FIG. 7 is a plan view taken along the line 7—7 of FIG. 6 and illustrating a visual indicator that may be employed in conjunctiOn with the present invention;

FIG. 8 is a partial sectional view of the vertical orienting means employed for a tooling station;

FIG. 9 is a longitudinal sectional view taken along the line 9—9 of FIG. 8;

FIG. 10 is a partial, longitudinal sectional view taken along the line 10—10 of FIG. 1 illustrating the construction of the initial positioning means;

FIG. 11 is a sectional view along the line 11—11 of FIG. 1 illustrating the construction of the punch head employed with the apparatus of the present invention;

FIG. 12 is a top plan view of a structural member of the type with which the present invention is concerned, illustrating the camber or curvature over the entire length of said member which must be taken into account; and FIG. 13 is a plan view of a control panel of the general type capable of being employed in conjunction with the present invention.

DESCRIPTION OF THE ILLUSTRATED EMBODIMENT

Referring now to the drawings, FIG. 1 illustrates the general construction of a tooling station 20 of the novel fabricating apparatus of the present invention, said apparatus being designated generally 22. The apparatus 22 is designed to accommodate an elongate structural member 24, such as the illustrated I-beam. The I-beam 24 is supported on a frame or stand (not shown) and is operatively engaged by drive means (also not shown) capable of producing controlled longitudinal movement of the I-beam 24 relative to the tooling station 20. In the illustrated embodiment, station 20 employs tooling means in the form of a punch head 28 designed to form aperture 26 in the web portion of I-beam 24. However, it is to be understood, that the tooling station 20 may be of a general type, other than that illustrated.

By way of background, the I-beams 24, as well as other structural members capable of fabrication of the present invention, are used in the erection of buildings or other structures. In this regard, numerous apertures 26 must be formed in the members to provide for interconnection during assembly. Most frequently, it is necessary that a plurality of apertures in a prescribed pattern be formed in the I-beam at various locations along their length, as illustrated in FIGS. 2 and 12. However, from beam to beam, the patterns will vary not only as to the location along the length of the beam, but also with regard to the arrangement thereof. That is, at one location, five apertures evenly spaced across the width of the beam may be required, while at the next location, only two such apertures may be desired.

While a high degree of accuracy is not absolutely necessary in the placement of the apertures 26, it is necessary that their positioning be sufficiently controlled so that these apertures align with corresponding apertures formed in structural members to be connected thereto. Thus, the problem resolves itself into that of properly positioning the punch head 28 with respect to the I-beam for the formation of each aperture. This problem is complicated somewhat by the fact that in rolling or forming of the I-beam, a "beam camber" is generally encountered, that is, the beam will have a slight curvature along its entire length, as illustrated in FIG. 12. However, as will be explained more completely hereinafter, this factor is taken into consideration and easily solved by the present invention.

In FIG. 2, there are illustrated typical patterns of holes 26 that may be formed in the end of an I-beam 24. It is to be kept in mind, that these patterns are closely spaced in FIG. 2 for illustrative purposes, and in practice, the distance between the respective patterns along the length of the beam may be considerable. For reference purposes, each hole 26 is defined or located by the intersection of an X-axis and a Y-axis, the former being disposed longitudinally of the elongate beam 24 and the latter transversely of said beam,. In the illustration of FIG. 2, five X-axes are illustrated and labeled $X_1$–$X_5$, while only three Y-axes, $Y_1$–$Y_3$, are shown. If the pattern of holes 26 along each of the transverse or Y-axes were to be the same, there would be little or no problem, however, such is not the case, in practice, as said patterns will vary.

Considering now the fabricating cycle, it is necessary to attain both longitudinal and transverse movement of the I-beam 24 relative to a tooling station 20 so as to position properly the punch head 28 over the exact location for the hole 26. With the illustrated apparatus 22, the I-beam 24 is moved longitudinally of the tooling station 20 by drive means (not shown) capable of controlled operation. In this regard, various forms of drive means may be employed, for example, the beam could be operatively connected to a carrier or truck-like member, or engaged by drive rollers mounted on the beam supporting stand. One form of automated longitudinal drive means is illustrated in U.S. application Ser. No. 32,097, filed Apr. 27, 1970, wherein a template is used to program longitudinal movement. Thus, it is possible to align properly the tooling station 20 with a desired transverse or Y-axis. However, it is still necessary to produce transverse movement of the tooling station 20 relative to the beam in order to properly locate the punch head 28 over the precise point on the aligned Y-axis where the apertures 26 are to be formed. In addition, due to the beam camber, it is necessary to provide positioning means capable of effecting initial positioning of the punch head 28 that is uniform for each location along the length of said beam. It is to the solution of the last two mentioned problems that the present invention is directed.

Returning to FIG. 1, tooling station 20 is comprised primarily of a C-shaped frame 30 which carries the punch head 28 on an upper arm 30' thereof and is mounted for vertical movement on guide rods 32. The guide rods 32 are in turn carried by a slidably mounted base platen 34 (as explained more completely hereinafter) and they extend upwardly through guides 36 on said frame 30 for connection at their upper ends with a plate 38. A housing 40 is disposed atop plate 38 and contains therein a drive arrangement designed for effecting vertical positioning of the C-shaped frame 30, and correspondingly punch head 28, the specifies of this drive means will be detailed more completely with regard to FIGS. 8 and 9. For the present, it is sufficient to realize that the upper portion of the frame 30 includes a vertically extending rod 42 which is threadedly engaged with driven means mounted within said housing 40, such that the frame 30 may be raised and lowered in order to position the punch head 28 properly with respect to I-beam 24.

The construction of the punch 28 is shown in FIG. 11. In this regard, punch 28 is of the hydraulically operated variety and includes an outer housing or casing 44 which defines a piston chamber 46 at the upper extremity thereof, said chamber having a piston member 48 disposed therein. A pair of hydraulic fluid ports 50 and 52 are provided, one communicating with the upper portion of said chamber 46 and the other with the lower portion of said chamber so as to provide a double-acting arrangement. A piston rod assembly 54 is connected to the piston member 48 and extends downwardly through an opening 56 in the lower chamber wall and has the movable die element 60 of the punch carried thereon. The housing 44 includes a vertically downwardly depending extension 62 which surrounds the piston rod 54 through most of its length, there being a key-and-slot arrangement 64 at the lower extremity thereof to limit vertical movement of the rod 54.

The lower or stationary die for the punch head 28 is designated 66 and is carried by the lowermost arm portion 30'' of the C-shaped frame 30. Thus, as can be seen in FIG. 11, the movable die 60 will be disposed on one side of the web of I-beam 24, while the stationary die 66 engages the underside of said web, such that upon the downward movement of the piston, the movable die 60 will shear a circular slug out of the web, thus producing an aperture 26.

For an understanding of the drive means used to achieve vertical positioninG of the frame 30, attention is now invited to FIGS. 8 and 9. As can be seen, within the housing 40 there is mounted a drive motor 70 that is operatively connected to a rotatable gear 72 by means of a worm drive 74. The gear 72 is internally threaded and is in engagement with a threaded portion 75 on the vertical rod 42. Therefore, upon operation of the motor 70, the gear 72 will be rotated, and due to the threaded engagement with the rod 42, will cause said rod and the associated C-frame 30 to move vertically. In order to accommodate the shock occasioned during the punching operation, the entire vertical drive arrangement is mounted on a plate 76 which is in turn resiliently mounted to the plate 38 by spring 78 to minimize the transmission of shock to said drive arrangement.

Returning now to FIG. 1, it will be recalled that the vertical guide rods 32 which support the C-shaped frame 30 are carried by a slidably mounted base platen 34. As can be viewed in the lower portion of said figure, there is provided a stationary base 80 that is preferably anchored to the floor. This base 80 has two pair of spaced rod blocks 82 which support a pair of horizontal guide rods 84, each of which is received within the guide bearings 86 of said base platen 34. Accordingly, said base platen 34 and the punch head 28, carried by the frame 30, are mounted for slidable movement transversely of the path of longitudinal movement of the I-beam 24.

The apparatus for attaining the initial positioning of the punch head 28, as well as that utilized for the subsequent indexinG of the punch head will now be considered. In this regard, the spacing of the apertures 26 on any given transverse Y-axis is generally some multiple of a given value, A which is represented by the spacing between the individual longitudinally extending axes $X_1$-$X_5$. Accordingly, initial positioning of punch 28 must be effected relative to some datum point and, then the punch indexed through a distance A, 2A, 3A, or some other multiple thereof to the precise point where an aperture 26 is to be formed. For convenience purposes, this datum point may be chosen as that point at which the aperture 26, closest to the edge 24' of the I-beam is to be located, that is to say, along the axis $X_1$. Accordingly, since the distance from the edge 24' to the axis $X_1$ can be measured and will remain constant at all times, this value, which is designated B for reference purposes, can be employed to effect initial positioning of the punch head 28.

The means or assembly for effecting the aforementioned initial positioning is best viewed and understood with reference to FIGS. 6 and 10, said means being designated generally 90. As can be seen from FIG. 6, the web portion of the I-beam 24 is disposed intermediate the upper and lower portions 30' and 30'' of the C-shaped frame 30. Thus, assuming alignment of the center line of punch 28 with a desired Y-axis, in order to locate the punch head over the datum point $X_1$, it is merely necessary to provide some form of guide means which will space said punch head 28 a distance B from the edge 24'. However, it must be kept in mind that the beam 24 has camber or curvature along its length, such that this positioning means 90 must be able to accommodate this variance.

Considering now specifically the overall construction of the positioning means 90, said means or assembly is carried by the central segment of the C-shaped frame 30 within a chamber 92. The assembly 90 includes a gauge roller 94 that is carried by a bifurcated bracket 96 mounted in an end of a sleeve 98. Said sleeve 98 is non-rotatably mounted within the bore 92 for slidable transverse movement. The opposite end of the sleeve 98 includes an internally threaded collar 100 within which is disposed the threaded end of a drive screw 102. The drive screw 102 is journalled for relative movement with respect to the frame 30 by means of a key-and-slot arrangement 104 which interconnects said drive screw to a bearing collar 106 which in turn is rotatably mounted with respect to said frame 30 by a bearing 108. Looking now to FIG. 10, it can be seen that the drive screw 102 projects outwardly of the collar 106 and has a sprocket gear 110 mounted thereon. The sprocket gear 110 is operatively connected with a drive motor 112 by means of sprocket chain 114. Accordingly, upon operation of the motor 112, the drive screw 102 will be rotated to produce transverse movement of the sleeve 98 relative to the passage 92. As such, the guide roller 94 may be advanced toward and away from the edge 24' of the I-beam to achieve the desired spacing between said roller and the center line of the punch 28, which, in the embodiment under discussion is equal to the value B.

Accordingly, with the roller 94 disposed, as illustrated in phantom in FIG. 6, in engagement with the edge 24' of the I-beam, the center line of punch 28 is positioned over the $X_1$ axis. To attain this engagement, there is provided a counterbalancing air cylinder 118 which is carried by the base platen 34. The actuator rod 120 of said air cylinder 118 is connected to a bracket 122 fixedly mounted to the stationary base plate 80. Thus, upon operation of said air cylinder 118, the base platen 34 can be moved along the stationary guide rods 84 producing corresponding movement of frame 30 to bring roller 94 into engagement with the edge 24.

In actual practice, the apparatus 22 includes a Y-axis readout (not shown) that provides a visual indication of the precise spacing between the roller 94 and the center line of punch head 28. Accordingly, after alignment of the punch head 28 with a selected Y-axis, the cylinder 118 is operated to bring gauge roller 94 into engagement with the edge 24' of the I-beam. The operator then energizes the gauge roller drive motor 112 which, by means of the aforementioned engagement of said roller with the I-beam, will cause the punch head 28 to move along the selected Y-axis. Thus, when the Y-axis readout indicates that said spacing corresponds to a value equal to the distance B, the center line of the punch 28 will be disposed immediately above the intersection of the selected Y-axis and the datum line, the $X_1$ axis. The punch head 28 is now in position to form an aperture 26 at the datum line $X_1$, should this be desired; or the frame is in position for indexing along said Y-axis to the point where the first aperture 26 is to be formed. Thus, the initial positioning of the punch head having been achieved, attention is now invited to FIGS. 3-5 for a discussion of the means employed to achieve this indexing.

Attention is directed first to FIG. 3 in order to attain a proper perspective of the disposition of the indexing means 130 with relation to the overall apparatus. In this regard, said figure is a sectional view taken along the line 3—3 of FIG. 1 immediately below the uppermost surface of the base platen 34, such that both sidewalls of said platen and the far right end wall, as viewed, are shown in section.

Indexing means 130 is comprised primarily of a U-shaped yoke or frame, having leg portions 134 and 136, which are spaced apart a sufficient distance to receive therebetween the sidewalls 138 and 140 of base platen 34. Yoke 132 is mounted for slidable movement relative to the base 80 by means of one or more pair of bearing pads 142. Also, this slidable mounting of yoke 132 is totally independent of the base platen 34, such that the legs 134 and 136 may move relative to the sidewalls 138 and 140, with the inner edges of said legs being disposed proximate the surfaces of the sidewalls for a purpose to be discussed more completely hereinafter. A prime mover, in the form of an air cylinder 142, is fixed to the base plate 80 and is operatively connected to the yoke 132 to effect the aforementioned slidable movement.

In order to impart movement to the base platen 34 and the punch head 28 and frame 30 carried thereby, the yoke 132 is provided with a clamping arrangement 144 illustrated in FIG. 5. In this regard, the leg 136 carries an actuator assembly 146, which in the illustrated embodiment includes an operating cylinder 148 having a retractable rod 150 with an end pad 152 adapted to engage the surface of the sidewall 140 upon operation of said cylinder 148. It should be noted, that a solenoid arrangement may be substituted for the operating cylinder 148, if desired. On the opposite yoke arm 138, there is provided a bracket 154 which carries a wear pad 156, said bracket bring in alignment with the actuator 146. Initially, a clearance exists between the sidewalls of platen 34 and the wear pad 156 and end pad 152, respectively, of approximately 0.010 inches on each side. Thus, when the cylinder 148 is operated, the rod end 152 will engage the surface of wall 140 forcing the opposite wall 138 into contact with the wear pad 156 to produce an interconnection between the yoke 130 and the base platen 34, which permits joint movement. In this regard, it should be noted that the mounting for said base platen 34 includes sufficient play to permit the slight movement of said base platen required during the clamping operation.

With the base platen 34 clamped between the legs 134 and 136 of the yoke 132, it can be seen that any movement of said yoke 132 produced by the prime mover 142 will result in corresponding movement of the base platen 34 along its supporting rods 84.

Next, with reference tO FIG. 4, an additional clamping assembly 160, identical to the assembly 144, is provided at a point spaced from the end of the yoke legs 134 and 136. In this regard, an operating cylinder 162, as well as the bracket 164, are fixed to the base plate 80. Accordingly, when the clamp 160 is operated, the engagement of the rod end pad 166 with the wall 140 of the platen will force the opposed wall 138 into engagement with the bearing pad 168 on the bracket 164. This clamping engagement fixes the position of the base platen 34 with regard to the stationary base 80, thus precluding relative movement of the frame 30 and punch head 28 with respect to the beam support frame (not shown), during punching of said I-beam 24.

From the above discussion, it can be seen that the interaction of the yoke 132 and the clamp 144 can be employed to effect movement of the base platen 34 and the associated punch 28 along the length of the selected Y-axis. In addition, once the desired positioning of the punch head 28 is reached, the clamp 160 may be activated to maintain the positioning of said punch 28. However, as will be recalled from the prior discussion, it is necessary that the platen 34 be indexed through only the distance A, viz., the spacing between the respective X-axis, and as such, some meanS must be provided to accomplish this end. Thus, attention is now directed to the means employed to achieve the desired indexing, with a complete description of the operating cycle to be detailed later.

Considering first the operation of the yoke 132, it can be seen that the prime mover, piston 142, has a given strOke which defines the maximum length of movement that can be attained by the platen 34 at any one indexing operation. That is, with the piston 142 in the retracted position, if clamp 144 is operated to engage the base platen 34 and then piston 142 is energized, the distance through which the platen assembly 34 and punch head 28 will move will be equal to the stroke of said piston. However, in practice, the desired indexing distance A will vary from one production run to another, and most always will be considerably less than the stroke of the prime mover 142. Accordingly, limiting means, designated 170 for reference purposes, is employed to control effectively the stroke of the piston 142 and to provide only the desired indexing movement. This limiting means 170 is readily adjustable to accommodate variances in the design requirements encountered in day-to-day operation.

The preferred form of limiting means 170 utilized with the illustrated embodiment can best be understood with reference to FIGS. 1, 3 and 6. In this regard, the primary element of said limiting means is an elongate rod 172 which, as shown in FIG. 6, extends beneath the mounting arrangement for the base platen 34. One end 174 of this rod (the left end as viewed in FIGS. 1 and 6) is non-rotatably connected to a sleeve 176, while the opposite end 178 is positioned to engage the base segment of the U-shaped yoke 132, as seen in FIG. 3. Accordingly, the amount that the yoke 132 can be moved by the prime mover 142 is controlled or limited by the spacing of rod end 178 from the base segment of said yoke. That is, with the rod 172 fully retracted to the left, the yoke 132 will move to a distance equal to the stroke of the piston 142; on the other hand, with the rod 172 fully extended to the right, end portion 178 will engage the yoke when the piston 142 is fully retracted so that movement thereof is precluded. By spacing the end portion 178 from the yoke 132 at a point somewhere between the abovementioned extremes, the stroke of the prime mover or the piston 142 can be adjusted and controlled as desired, viz., selected to produce an indexinG movement equal to the distance A.

The end portion of the rod 172, approximate end 178, is designed to accommodate any shock occasioned with the operation of the yoke 132. That is, there is provided a slidably mounted block 180 that is urged toward the yoke 132 by a spring 182, stop means maintaining the block on said rod. The yoke 132, in turn, has an abutment member 184 carried thereon for engagement with the spring biased block 180, as can be seen in FIG. 3. Accordingly, as the yoke 132 moves forward, the abutment 184 will strike the block 180 with any shock occasioned therewith being absorbed by the spring 182.

The adjustment in the positioning of the rod 172 is attained primarily by means of the aforementioned sleeve 176 which is non-rotatably connected to the end portion 174 of said rod. The sleeve 176 is also non-rotatably mounted with regard to the base 80, although free to mOve horizontally along the surface of said base. The left-hand end of the sleeve 176 is defined by an internally threaded cap-nut 186, which is engaged with an externally threaded drive screw 188 journalled for rotative movement by a bearing block 190. The drive screw 188 carries a sprocket gear 192 thereon that is operatively connected with a handwheel 194 by means of a sprocket chain 196 and a second sprocket gear 198 carried by the axle of said wheel. Accordingly, when the wheel 194 is turned, rotation is imparted to the drive screw 188 which causes the sleeve 176 and the associated elongate rod 172 to move horizontally.

In order to provide a readout or reference as to the aforementioned spacing between the rod end 178 and the yoke 132, which spacing it will be recalled is preferably equal to the value A, the sleeve 176 is provided with indicator means. The indicator means of the disclosed embodiment is in the form of a bracket 200 carried by said sleeve and having a pointer 202 on the upper end thereof, FIG. 7. As can be seen in said FIG. 7, the pointer 202 is associated with a scale 204 carried on an upper horizontal surface of the apparatus and positioned to be viewed by the operator. The scale 204 will include suitable indicia coordinated with the overall parameters of the system so as to provide the operator with an accurate reading at all times of the spacing of rod end 178 from yoke 132.

As such, the operator can select the desired space of the aforementioned rod end from yoke 132 by operation of the handwheel 194, with the pointer 202 and scale 204 getting a sufficiently accurate indication of this value. Once the positioning of the end portion 178 is selected, this end portion will limit the stroke of the piston 142 which in turn will correspond to the distance through which the indexing means 130 (yoke 132 and clamp 144) can move the punch head 28, as described previously.

It will be understood that in order to effect an automatic or semi-automatic operation, it is necessary that various control means be associated with the apparatus as herein described to achieve the desired sequence of operation. For purposes of clarity and brevity in the discussion of the present invention, a detailed disclosure and explanation of a preferred form of control means has been omitted, except for that to follow with regard to the control panel of FIG. 13. This has been done since numerous such systems may be constructed all capable of achieving the desired mode of operation with no one system being all inclusive. Therefore, form the detailed explanation of the structure and its mode of operation, one skilled in the art could devise one or more control systems capable of achieving the desired sequence operation.

A detailed discussion of the novel method of fabricating effected with the apparatus of the present invention will now be considered. However, it is deemed advantageous to first consider FIG. 13, wherein a preferred form of control panel is illustrated which is employed with the control means mentioned above.

With reference to FIG. 13, there is shown a typical form of control console that can be used, which includes numerous actuator and selector switches as described hereinafter. First of all, there is an on-off switch 206 which controls the application of power to the apparatus 22. A selector switch 208 which enables the apparatus to operate on an automatic cycle or a manual cycle to be discussed more completely hereinafter is also provided. Disposed below said selector switch 208 are a forward and reverse switch 210 for the indexing means 130, a palm operated switch 212 for manually operating the indexing means 130, and a palm switch 214 used to initiate the automatic fabricating cycle. In addition, there is provided a cycle index control 216 which permits a selection of the number of indexing steps in each operating cycle. Finally, a palm button 218 is included which permits manual activation of the punch 28. It should be noted that where an automated cycle is employed, punch 28 is actuated automatically in conjunction with the operation of the indexing means 130.

First of all, it must be kept in mind that the primary object of this invention is to provide a method and apparatus that can be constructed inexpensively and adapted to existing systems in order to effect an automatic or semi-automatic fabricating cycle employing various tooling operations. As such, the description to follow will be concerned primarily with the formation of apertures 26 in the web portion of the I-beam 24. However, it should be kept in mind that the present invention is also adapted for use with other structural members, and the tooling operation need not be limited to the punching of apertures 26.

Turning now to FIG. 2, it is necessary during initial set-up, to determine certain parameters or values, namely the distance A between various X-axes, as well as the distance B, the spacing from the edge 24' to the datum line to be employed in the present case, the $X_1$ axis. After this is accomplished, the vertical drive arrangement within housing 40 is employed to position properly the punch 28 for reception of beam 24.

Next, the I-beam 24 is placed upon the supporting stand (not shown) and is advanced by the longitudinal drive means (also not shown) until the $Y_1$ transverse axis is in alignment with the center line of punch 28.

This operation may be done manually, or automatically, one method and apparatus for effecting this operation automatically being disclosed in the aforementioned pending application Ser. No. 32,097. After proper alignment of punch 28, the counterbalancing cylinder 118 is actuated to advance the frame 30 to bring the roller 94 into contact with the edge 24'; said roller being in the fully retracted position as shown in full line in FIG. 6. A Y-axis readout (not shown) is included with apparatus 22 which gives a visual indication of the exact spacing between the roller 94 and the center line of punch 28. This readout may be operated off the drive screw 102. Accordingly, once the roller 94 is brought into contact with the edge 24', the motor 112 is operated to extend the roller supporting sleeve 98 which causes roller 94 to push against the edge 24 biasing the C-shaped frame 30 to the right as viewed in FIG. 6. With reference to the Y-axis readout, the operator can determine the precise positioning of the center line of the punch 28 and will deenergize the motor 112 when this value corresponds to the distance B. As such, the apparatus is now in position for formation of the first aperture $26_1$, FIG. 2.

Either before or after positioning of punch 28, the handwheel 194 is rotated to achieve a spacing between the end 178 of the rod 172 and the yoke 132 which is equal to the distance A. Thus, assuming an automatic cycle, after initial positioning, the cycle index control 216 is set to 4, the number of indexing steps required. The on-off switch 206 is turned to the "on" position which energizes the clamp 160 to firmly engage the base platen 34 and fix the positioning of the punch head relative to the beam 24. Also, at this point, clamp 144 is opened and the prime mover 142 is in the fully retracted position. The operation of the "on" switch also vents or de-energizes the counterbalancing cylinder 118 and automatically operates the motor 112 of the initial positioning device 90 so as to fully retract the gauge roller 94.

With the switch 206 in the "on" position, and the selector switch 208 turned to "auto", as well as the switch 210 set for forward movement of the carriage, the auto cycle palm button 214 is now depressed. Upon operation of the palm 214, the punch head 28 is energized to form the initial aperture $26_1$, also, the clamp 144 may be operated to engage the base platen in order to provide additional stability. Upon retraction of the movable die 60 of the punch 28, clamp 160 is de-energized to free the base platen 34 for movement. Immediately after de-energization of the clamp 160, the prime mover cylinder 142 is operated with the clamp 144 still engaging the base platen 34. This energization of the prime mover cylinder 142 causes the yoke 132 to move to the left as viewed in FIG. 3 until the abutment member 184 of said yoke engages the stop block 180. At this point, the first indexing step is completed and the punch 28 is now in position over the point at which the aperture $26_2$ is to be formed. By means of the cycle index control 216, clamp 160 is re-energized to grip firmly the base platen 34. At this point, the yoke clamp 144 is disengaged and the prime mover 142 operated to retract the yoke in preparation for the next indexing operation. In conjunction with said disengagement of clamp 144 and retraction of yoke 132, the punch head 28 is again energized to form the aperture $26_2$. Upon retraction of the movable punch die 60, clamp 160 is released and the yoke clamp 144 is actuated along with the prime mover 142 to index the punch head 28 to the next location, viz., the intersection of the $Y_1$ axis with the $X_3$ axis. This cyclic operation is repeated until the cycle index control has timed out, i.e. four such indexings after formation of aperture 26, at which time the punch 28 is disposed above the aperture $26_5$.

With continued reference to FIG. 2, and assuming that the next step is the formation of the five apertures ($26_6$–$26_{10}$) located along the Y axis, without retraction of the punch head 28, the longitudinal drive means is actuated to now align the punch head 28 with the $Y_2$ axis. The punch 28 is now disposed over the point of intersection of the $X_5$ and the $Y_2$ axes, viz., in position to form aperture $26_6$. At this point, the switch 210 is shifted to the reverse position. When this happens, the control system is set up to reverse the sequence of operation as to that described above. That is, clamp 144 will open, while the piston 142 is advanced to the extended position, viz., the yoke 132 engages against the stop 180. Therefore, upon depression of the auto cycle palm button 214 at this time, the clamp 160 will close and the punch 28 automatically operated to form the apertures $26_6$. Next, the movable punch die 60 will retract and the clamp 160 opens. When this happens, the yoke clamp 144 is automatically actuated to the closed position and the piston 142 retracted to index the punch 28 to the right into position for forming the next aperture. When indexing is completed, the yoke clamp 144 opens, clamp 160 closes, and the piston 142 is extended to position the indexing means 130 for the next operation. Either during or at termination of the repositioning of the indexing means 130, the punch 28 is operated to form the hole $26_7$. As was the case with the forward operation of the device, the cyclic indexing and punching is repeated until the formation of the apertures $26_6$–$26_{10}$ is completed.

The above-referred to forward and reverse cycling of the machine works extremely well where row or patterns of apertures having the same spacing are to be formed. However, with reference to the $Y_3$ and $Y_4$ axes, these irregular patterns must be handled in a different manner. The apertures on the $Y_4$ axis can be formed either manually or automatically, while those on the $Y_3$ axis must be formed by use of a semi-automated cycle, as discussed hereinafter.

Considering first the $Y_3$ axis, if automatic operation is to be employed, the handwheel is adjusted so that the spacinG between the stop 180 and the yoke 132 corresponds to a value 2A, viz., the spacing between the $X_1$ and $X_3$ axes. The initial positioning means 90 is employed to locate the punch over the intersection of the $X_1$ and $Y_3$ axes. Accordingly, when the auto cycle palm button 214 is depressed with the index cycle control being set to 2, the aperture $26_{11}$ is formed. The automatic operation of the apparatus 22 next energizes the indexing means 130 to move punch 28 through the distance 2A to locate said punch at the intersection of the $X_3$ and $Y_3$ axes for formation of the aperture $26_{12}$. The continued operation is similar to that described previously, until all the apertures on the $X_3$ axis are formed.

As to the semi-automated operation of the apparatus 22, this is used to accommodate irregular aperture patterns. That is, patterns wherein the disposition of the aperture 26, with respect to the datum line and to each other are not the same; for example, a hole $26_{14}$ is spaced the distance A from the datum line $X_1$ wherein the hole $26_{15}$ is spaced a distance 2A from the hole $26^{14}$. In the formation of these apertures, after the punch 28 is aligned with the intersection of the $X_1$ and $Y_4$ axes, the datum point, the operator rotates the switch 208 to the manual position. Next, handwheel 194 is adjusted to provide an indexing length which is equal to the value A. Accordingly, since no hole is to be punched at the intersection of the $X_1$ and the $Y_4$ axes, the operator need merely depress the index palm button 212, when the indexing means 130 is operated, as described previously, to align the punch 28 with the intersection of the $X_2$ and the $Y_4$ axes.

Since the apparatus 22 is not operating on an automatic cycle, indexing alone is not sufficient to actuate the punch 28. To form the aperture $26_{14}$, the operator must manually depress the web punch button 222 which operates to close clamp 160 in conjunction with actuation of the punch 28. Upon retraction of the movable punch die 60, the clamp 160 is opened. To effect positioning of the punch head 28, with respect to the location at which the hole aperture $26_{15}$ is to be formed, the index palm button 212 must be depressed twice as is clear from FIG. 2. Once the proper positioning is achieved, formation of the aperture $26_{15}$ proceeds as discussed heretofore.

If desired, the cycle index control 216 may be set up for employment in conjunction with the manual operation of the device. That is, control apparatus may be devised wherein if the index control 216 is set to a given number, 2 for example, each depression of the index palm button 212 will result in two indexing operations without automatic actuation of the punch head 28. An arrangement such as this could be employed to advantage in the formation of the aperture pattern such as that on the $Y_3$ axis, in that it would permit rapid indexing without the necessity of operating the handwheel 94 to change the indexing stroke of piston 142. That is, instead of the aforementioned automatic formation of the holes along the $Y_3$ axis, they would be done semi-automatically in that each depression of the index palm button would produce two indexing steps, manual operation of the punch head 28 being employed.

As still another alternate arrangement, it is possible to effect fabricating without employment of the indexing means 130. In this regard, the apparatus is controlled manually with the initial positioning means 90 being used to align the punch 28 with the desired point on the selected Y-axis. Once proper positioning is attained, clamp 160 is actuated to clamp firmly the base platen 34 with regard to base 80, and the punch 28 actuated to form an aperture 26. Movement to the next point is achieved by coordinated operation of the counterbalancing cylinder 118 and motor 112 to cause the punch 28 to move along the said axis.

With the apparatus and method as described above, it is believed clear that the present invention provides an improved and highly economical method and apparatus for effecting fabrication of the structural member. More specifically in this regard, the preferred embodiment of the present invention is such that considerable time is saved in the fabrication of a beam. For example, assuming the punch of the pattern along the axes $Y_1$ and $Y_2$, the formation of the ten apertures illustrated can be performed in approximately 58 seconds, as compared with a time of about 30 seconds per aperture with totally manually controlled machinery. While there is a 5-to-1 ratio in time saved in this operation, the ratio will vary from pattern to pattern.

While a preferred form of the present invention has been illustrated and described, it is realized that those skilled in the art may devise various alternate constructions, additions or changes in the disclosed method and apparatus. Insofar as these alterations, additions or changes fall within the scope of the claims presented hereinafter, they are contemplated by the present invention and form a portion thereof.

What is claimed is:

1. A machine for use in a fabricating cycle wherein a series of tooling operations are performed on an elongate workpiece, said operations being performed at predetermined points on selected axes extending transversely to the elongate axis of said workpiece and disposed along the length thereof, said machine comprising:

A work station including tool means for performing said tooling operations, and means supporting said tool means for movement along a path disposed transversely to the elongate axis of the workpiece;

Advancing means for effecting relative longitudinal movement of said workpiece with respect to the work station, such that a selected one of said transverse axes may be aligned with the tool means;

Apparatus for properly positioning and then operating the tool means at points on said transverse axis, said apparatus including:

An indexing arrangement operably associated with the tool means and capable of indexing said tool means to the points on an axis at which the tooling operations are to be performed, said indexing arrangement including reciprocal means capable of selective operative connection and disconnection with the tool means so that selective movement of said tool means in a desired direction may be attained, said movement being limited to increments which are directly related to the spacing between said points; and Control means for actuating said indexing arrangement and said tool means to attain performance of the tooling operations at said points.

2. A machine as defined in claim 1 and further including selectively operable clamping means for fixing the position of said tool means during the tooling operation.

3. A machine as defined in claim 1 wherein said apparatus for properly positioning and operating the tool means further includes gauge means capable of initially locating said tool means properly with respect to a first point on a selected transverse axis at the commencement of the fabricating cycle.

4. A machine as defined in claim 1 wherein said control means includes means for reversing the operation of said indexing arrangement so that after completion of a first series of tooling operations on a selected axis, said tool means may be aligned with a second transverse axis without effecting retractive movement of said tool means, and a second series of tooling operations performed at points on said second transverse apparatus with the tool means being indexed along said second axis in a direction of movement opposite to that effected during performance of said first series of tooling operations.

5. A machine as described in claim 1, wherein said reciprocal means includes a member mounted for slidable movement, drive means for said member, and clamping means carried by said slidably mounted member for effecting connection and disconnection between said member and the tool means.

6. A machine as defined in claim 1 wherein said indexing arrangement includes: a member slidably mounted for movement along a path extending parallel to the path of movement of said tool means; drive means operably coupled to said member for effecting reciprocal movement thereof; means carried by said member for effecting selectively operable connection of said member with the tool means so that during said connection, joint movement thereof may be attained; adjusting means for defining the length of the path of reciprocal movement of said member whereby said lengths may be selected to correspond to the spacing between said point on a transverse axis at which the tooling operations are to be performed with said joint movement producing indexing of said tool means from one said point to the other.

7. A machine for use in a fabricating cycle wherein a plurality of tooling operations are performed on an elongate workpiece, said operations being performed at one or more points on selected axes extending transverse to the elongate axis of said workpiece and disposed along the length thereof; said machine comprising: a work station including tool means for performing said tooling operations; advancing means for effecting relative longitudinal movement of the workpiece with respect to said work station so as to align said tool means with a selected one of said transverse axes; and apparatus for operating said machine to affect the fabricating cycle, said apparatus including initial positioning means operable to align said tool means with a first point on said selected transverse axis, indexing means for producing relative movement to position said tool means in relation to additional selected points on said transverse axis said indexing means including reciprocal means capable of selective, operative connection and disconnection with the tool means for producing said relative movement, and control means for coordinating the operation of said tool means and said indexing means to achieve the fabricating cycle.

8. A machine for use in a fabricating cycle wherein a series of tooling operations are performed on an elongate workpiece, said operations being performed at predetermined points on selected axes extending transversely to the elongate axis of said workpiece and disposed along the length thereof, said machine comprising:

A work station including tool means for performing said tooling operations, and means for supporting said tool means for movement along a path disposed transversely to the elongate axis of the workpiece;

Advancing means for effecting relative longitudinal movement of said workpiece with respect to the work station, such that a selected one of said transverse axes may be aligned with the tool means;

Apparatus for properly positioning and operating the tool means at points on said selected transverse axis in alignment with the tool means, said apparatus including:

Initial positioning means operable to effect proper positioning of the tool means with regard to a datum point on said selected transverse axis;

An indexing arrangement operably connected with the tool means for moving said tool means along said path from said datum point in predetermined increments so as to properly align the tool means with the other points on said axes at which tooling operations are to be performed, said indexing arrangement including reciprocating means capable of selective, operative connection and disconnection with the tool means for producing said movement; and Actuating means for effecting operation of said tool means at the said predetermined points on the transverse axes.

9. A machine as defined in claim 8 wherein said reciprocating means includes a slidably mounted reciprocal member carrying means for effecting selective connection with the tool means, such that said reciprocal member may be operatively connected with the tool means for joint movement.

10. A machine as defined in claim 8 wherein said reciprocating means includes a reciprocal member mounted for movement along a path extending parallel to the path of movement of said tool means; actuating means operably connected to said member for effecting reciprocal movement thereof; means for selectively determining the limits of reciprocal movement of said member; and clamp means carried by said reciprocal member for selectively engaging said tool means, such that upon engagement, said tool means and said reciprocal member are operatively connected for joint movement, which is effective to produce indexing of the tool means from one point on said selected axis to another.

11. A machine as defined in claim 8 wherein said initial positioning means includes a gauge roller supported on an end of a sleeve carried by the tool means and mounted for movement transverse to the length of said workpiece, and drive means connected with said sleeve for effecting controlled movement, whereby said gauge roller may be brought into engagement with said workpiece, and said drive means for the sleeve operated to control the positioning of said tool means along said selected transverse axis.

12. A machine for use in a fabricating cycle wherein a series of tooling operations are performed on an elongate workpiece, said operations being performed at predetermined points on selected axes extending transversely to the elongate axis of said workpiece and disposed along the length thereof, said machine comprising: a work station including tool means for performing said tooling operations, and means supporting said tool means for movement along a path disposed transversely to the elongate axis of the workpiece; advancing means for effecting relative longitudinal movement of said workpiece with respect to the work station, such that a selected one of said transverse axes may be aligned with the tool means; apparatus for properly positioning the tool means with respect to a selected transverse axis in alignment with the tool means, said apparatus including: a sleeve carried by said tool means and mounted for reciprocal movement transversely of the length of said workpiece, gauge means carried by a free end of said sleeve for engagement with said workpiece, drive means for said sleeve capable of operation to produce continued reciprocal movement of said sleeve, whereby said gauge means may be forced against the workpiece to produce movement of said tool means.

13. A machine as defined in claim 12 wherein said gauge means is a roller carried by said sleeve.

14. A machine as defined in claim 12 further including biasing means for producing movement of said tool means along said path to bring said gauge means into engagement with said workpiece, the operation of the drive means for said sleeve in either direction in conjunction with the continued force applied by said biasing means capable of producing reciprocal movement of the tool means along the selected transverse axis.

15. A method of performing numerous tooling operations on an elongate workpiece with tooling means, wherein relative movement of the tool means perpendicular to said workpiece may be attained, and wherein tooling operations are to be performed at a series of points on selected axes extending transversely of the elongate axis of the workpiece and disposed along the length thereof, said method comprising the steps of: aligning a selected transverse axis with the tool means; locating said tool means in position above a first point on said transverse axis alternately effecting operative engagement and disengagement of said tool means with a movable member confined to reciprocal movement along a path between set limits which define a stroke of said reciprocal movement whereby said tool means and said member are interconnected for joint movement with reciprocation along said path effecting indexing of said tool means to positions in alignment with the points in said series; actuating said tool means at the proper time to effect said tooling operation at said points; and repeating said indexing and actuating of the tool means until the series of tooling operations on said axis is completed.

16. A method as defined in claim 15 further including the step of: adjusting said limits of reciprocal movement of the movable member to conform to the spacing between the points on said transverse axis at which said tooling operations are to be performed.

17. A method as set forth in claim 15 and further including the steps of:
Maintaining said tool means in position after completion of the last tooling operation on said transverse axis;
Moving said workpiece relative to said tool means to locate a second transverse axis on which tooling operations are to be performed in alignment with said tool means; and
Reversing the operation of said movable member to effect indexing of said tool means along said second transverse axis in a direction of travel opposite to that undertaken by said tool means in conjunction with the tooling operations performed on said first mentioned transverse axis.

18. A method as defined in claim 15 wherein said step of locating the tool means with respect to a first point includes the steps of: engaging the workpiece with retractable gauge means carried by said tool means; and operating said gauge means to produce movement of the tool means relative to said workpiece along said transverse axis.

19. A method of performing numerous tooling operations on an elongate workpiece with tooling means, wherein relative movement of the tool means perpendicular to said workpiece may be attained, and wherein tooling operations are to be performed at a series of points on selected axes extending transversely of the elongate axes of the workpiece and disposed along the length thereof, said method comprising the steps of:
Aligning a selected transverse axis with tool means;
Locating said tool means in position above a first point on said transverse axis, the spacing of which from an adjacent edge of said workpiece corresponds to a predetermined value;
Actuating said tool means to effect said tooling operation at said first point, if desired;
Operatively engaging said tool means with a movable member confined to reciprocal movement along a path between set limits which define a stroke of said reciprocal movement whereby said tool means and said member are interconnected for joint movement;
Reciprocating said movable member in one direction along said path to effect indexing of said tool means from said first point to the next point in said series on said transverse axis;
Disengaging said movable member from said tool means and retracting said movable member along said path for subsequent engagement with and indexing of the tool means to still another point in said series; and
Repeating said indexing and operating of the tool means until the series of tooling operations on said axis is completed.

20. An indexing arrangement for use in a fabricating machine, or the like, wherein a series of operations are performed on a workpiece at predetermined points on a selected axis by tooling means, or the like, said indexing arrangement adapted to be operably associated with said tooling means and capable of indexing said tooling means along a path to the points on said axis at which said operations are to be performed, said indexing arrangement including; a member slidably mounted for movement along a path extending parallel to the path of movement of said tooling means for performing the operations; drive means operably coupled to said member for effecting reciprocal movement thereof; means carried by said member for effecting selectively operable connection of said member with said tooling means so that joint movement thereof may be attained; adjusting means for defining the length of the path of reciprocal movement of said member, whereby said lengths may be selected to correspond to the spacing between the points on said axis at which the operations are to be performed with said joint movement producing indexing from one said point to the other.

21. An indexing arrangement as defined in claim 20 wherein said slidably mounted member is of a U-shaped construction having a pair of spaced, parallel leg segments disposed in surrounding relation to a supporting portion of the tooling means, and said means for effecting operable connection of said member to the tooling means includes a clamping arrangement comprised of an actuator carried by one said leg segment and an abutment bracket carried by the other leg segment whereby said actuator may be selectively operated to produce clamping engagement with said supporting portion in preparation for the effecting of joint movement of said member and said tooling means.

22. An indexing arrangement as defined in claim 21 further including an additional clamping arrange-ment carried by a stationary supporting surface and adapted to engage the supporting portion of the tooling means to fix the position of said tooling means with respect to the supporting surface.

* * * * *